(12) United States Patent
Kreutz et al.

(10) Patent No.: US 7,818,115 B2
(45) Date of Patent: Oct. 19, 2010

(54) PROCEDURE FOR DETERMINING A NAVIGATION SOLUTION OF A NAVIGATION SYSTEM WITH A TERRAIN NAVIGATION MODULE, AS WELL AS A NAVIGATION SYSTEM

(75) Inventors: Peter Kreutz, Skye (DE); Juergen Metzger, Karlsruhe (DE); Bernd Taddiken, Delmenhorst (DE)

(73) Assignee: EADS Deutschland GmbH, Ottobrunn (DE)

( * ) Notice: Subject to any disclaimer, the term of this patent is extended or adjusted under 35 U.S.C. 154(b) by 984 days.

(21) Appl. No.: 11/471,661

(22) Filed: Jun. 21, 2006

(65) Prior Publication Data

US 2007/0010939 A1  Jan. 11, 2007

(30) Foreign Application Priority Data

Jun. 22, 2005  (DE) .................. 10 2005 029 217

(51) Int. Cl.
*G01C 21/00* (2006.01)

(52) U.S. Cl. .................. 701/200; 701/207; 701/208; 701/209; 701/214; 701/216; 701/220; 340/947; 342/64; 342/65; 342/120; 342/123; 342/357.01; 342/357.13; 342/357.14

(58) Field of Classification Search .................. 701/120, 701/122, 200, 207, 208, 209; 340/947, 961; 342/29, 64, 65
See application file for complete search history.

(56) References Cited

U.S. PATENT DOCUMENTS

| | | | |
|---|---|---|---|
| 4,144,571 A | 3/1979 | Webber | |
| 5,991,691 A * | 11/1999 | Johnson | 701/214 |
| 6,094,607 A * | 7/2000 | Diesel | 701/4 |
| 6,208,937 B1 * | 3/2001 | Huddle | 701/221 |
| 6,218,980 B1 | 4/2001 | Goebel et al. | |
| 6,389,354 B1 | 5/2002 | Hicks et al. | |
| 6,453,238 B1 * | 9/2002 | Brodie et al. | 701/216 |

(Continued)

OTHER PUBLICATIONS

G.S. Gordon, Navigation systems integration, Feb. 1997, IEEE, Airborne navigation systems workshop (digest No. 1997/169), IEE colloquium, pp. 6/1-6/17.*

(Continued)

*Primary Examiner*—Khoi Tran
*Assistant Examiner*—Jaime Figueroa
(74) *Attorney, Agent, or Firm*—Crowell & Moring LLP

(57) ABSTRACT

A navigation solution of a navigation system with a Terrain Navigation Module is determined by a procedure including determining a supported position solution and the relative covered path between two height measurements, ascertaining a quality of each active supported position from each active supported position by way of a first quality function, and creating a search area and predetermined positions for each position inside the search area and each relatively stored covered path. The procedure further includes ascertaining a quality of each relatively stored terrain height measurement, and a quality of each reference height, and determining the quality of the position support by a function of all minimum probabilities of all used positions in the search area and supporting the navigation solution ascertained in the Strap Down Module by the navigation filter with the aid of the determined position support and the determined quality of the position support. A navigation system with a Strap Down Module and a navigation filter and a Terrain Navigation Module for determining the navigation solution are also described.

19 Claims, 2 Drawing Sheets

U.S. PATENT DOCUMENTS

| | | | | |
|---|---|---|---|---|
| 6,480,789 | B2* | 11/2002 | Lin | 701/301 |
| 6,512,976 | B1* | 1/2003 | Sabatino et al. | 701/207 |
| 6,538,581 | B2* | 3/2003 | Cowie | 340/961 |
| 6,734,808 | B1* | 5/2004 | Michaelson et al. | 340/984 |
| 6,750,815 | B2* | 6/2004 | Michaelson et al. | 342/357.13 |
| 7,145,501 | B1* | 12/2006 | Manfred et al. | 342/120 |
| 7,289,906 | B2* | 10/2007 | van der Merwe et al. | 701/214 |
| 7,305,303 | B2* | 12/2007 | Soehren et al. | 701/221 |
| 2002/0188386 | A1* | 12/2002 | Day | 701/4 |
| 2005/0125141 | A1* | 6/2005 | Bye | 701/200 |
| 2005/0273257 | A1* | 12/2005 | Hager et al. | 701/223 |

OTHER PUBLICATIONS

Peters, M. A. G., Development of a TRN/INS/GPS integrated navigation system, Mar. 1992, IEEE, Position Location and Navigation Symposium, 1992. Record. 500 Years After Columbus—Navigation Challenges of Tomorrow. IEEE Plans '92., IEEE, pp. 202-208.*

John Proakis, Exact distribution functions of test length for sequential processors with discrete input data, Jul. 1963, IEEE Transactions on information theory, vol. 9, issue 3, pp. 182-191.*

Engineering productivity tools, Annex C—Convolution, 1999, Internet, pp. 1-4.*

Jean Dezert, *Improvement of Strapdown Inertial Navigation Using PDAF*, IEEE Transactions on Aerospace and Electronic Systems, vol. 35, No. 3, Jul. 1999, pp. 835-856.

D. E. Di Massa, et. al., *Terrain-Relative Navigation for Autonomous Underwater Vehicles*, IEEE, 1997, pp. 541-546.

Feng Qingtang, et. al., *Terrain Aided Navigation Using PDAF*, IEEE International Conference on Robotics, Intelligent Systems and Signal Processing, Oct. 2003, pp. 1063-1068.

* cited by examiner

PROCEDURE FOR DETERMINING A NAVIGATION SOLUTION OF A NAVIGATION SYSTEM WITH A TERRAIN NAVIGATION MODULE, AS WELL AS A NAVIGATION SYSTEM

This application claims the priority of German application 10 2005 029 217.8, filed Jun. 22, 2005, the disclosure of which is expressly incorporated by reference herein.

This invention concerns a procedure for determining a navigation solution of a navigation system with a Terrain Navigation Module, as well as that navigation system.

In a manuscript by D. H. Titterton and J. L. Weston titled Strapdown Inertial Navigation Technology, Peter Peregrinus Ltd. 1997, it is represented that, with the help of a strap down algorithm, which integrates acceleration and rotation rate, an inertial navigation system can be constructed. This inertial navigation system represents the basis for a navigation system which determines speed and position of the craft. Since the integration of inertial sensor data, which is full of errors, does not allow a long-term, stable navigation solution, other sensors, such as, for example, the Global Positioning System (GPS), which allows for an absolute determination of position, are fused with the solution of the inertial navigation system. In Global Positioning Systems, Inertial Navigation, and Integration, John Wiley & Sons, Inc., 2001, Mohinder S. Grewal, Lawrence R. Weill and Angus P. Andrews describe that, with a stochastic filter, in particular, a Kalman filter, the solution of the inertial navigation is fused with other sensor data, in particular GPS. Through the dependence of the GPS on external satellite signals, it is easily possible that such a system can be disrupted either intentionally or unintentionally. For this reason, other sensor signals can also be brought in for fusion with the inertial navigation solution. Such a sensor signal can be produced by a Terrain Navigation Module, based on distance measurements in relation to the ground (radar, laser, sonar . . . ), hereafter called height measurements. This results through a comparison of the terrain height measurements, obtained from altimetry, with a reference map, which contains the actual terrain heights. There exist more points of departure; as such, a terrain navigation system can be designed. In a manuscript by F. Gustafsson, F. Gunnarsson, N. Bergman, U. Forssell, J. Jansson, R. Karlsson, and P. Nordlund a titled Particle Filters for Positioning, Navigation, and Tracking, *IEEE Transactions on Signal Processing*, 50, 425-435, 2002, a group, based on nonlinear, stochastic filters, in particular particle filters, is described.

However, this group has a few disadvantages pertaining to its modularity (the possibility of a separate development of a navigation system and Terrain Navigation Module), as well as the acquisition performance (the possibility of many initial position errors to correct). The second group is based on a comparison of procedures, which make a direct comparison of terrain height measurements and reference map and is described by J. P. Goldon in Terrain Contour Matching (TERCOM): a Cruise Missile Guidance Aid, Proceedings of the SPIE Image Processing for Missile Guidance, Volume 238, 1980. These procedure comparisons are modular and have outstanding acquisition and tracking performance. The disadvantage lies therein that this Terrain Navigation Module does not supply quality information of the individual position support. Previous procedures, such as those described by J. Metzger, O. Meister, G. F. Trommer, F. Turnbrägel, and B. Tadiken in Covariance Estimation for Terrain Referenced Navigation with a Comparison Technique, *Proceedings of the ION 60$^{th}$ Annual Meeting*, June 7-9, Dayton, Ohio, USA, 2004, thus employ heuristic procedures to determine the quality that is necessary for fusion. In particular, the roughness of the terrain is analyzed in such a heuristic procedure, and, hence, the expected quality of the position support is approximated. Since, in addition to roughness, other factors, such as the quality of the IMU, the quality of the reference maps, as well as of the comparison algorithms themselves, also have an effect on the quality of the position supports, the ascertained quality is only a suboptimal solution. A second procedure is described by J. Metzger and G. F. Trommer in Improvement of Modular Terrain Navigation Systems by Measurement Decorrelation, *Proceedings of the ION 59$^{th}$ Annual Meeting*, June 23-25, Albuquerque, N. Mex., USA, 2003, and approximates the variance of position supports from several previous position supports. This, however, assumes a stationary, ergodic white noise process for the errors of the position fixes, which, in most cases, does not apply. Also, this description of the quality is, consequently, suboptimal. It is thus one object of the invention to permit a clear, precise specification of the quality of the position supports.

It is a further object of the invention to provide a procedure for determining a navigation solution in a navigation system with a Terrain Navigation Module, with which it is possible to determine the navigation solution, and in particular the position, speed, and location, with improved quality.

These objects are achieved by way of a process according to the present invention. Certain preferred embodiments are defined by the dependent claims.

According to the invention, a procedure for determining a navigation solution of a navigation system with a Terrain Navigation Module may include the following steps:

Determining a navigation solution, an estimated position solution, and the relative covered path between two terrain heights measurements with the aid of navigation sensors, a Strap Down Module, and a navigation filter, Ascertaining the quality of the respective active supported position from the respective active supported position by means of a first quality function, Creating a search area on the basis of predetermined criteria and on the basis of a respective predetermined supported position solution, and creating predetermined positions inside the search area, and Storage of an active terrain heights measurement and the relative covered path between the active terrain heights measurements and the last stored terrain height measurement in order to employ this to determine the quality of a relatively covered path, as well as the quality of a respective stored terrain height measurement.

The procedure may also include:

Determining a relative position for a respective position inside the search area and a respective stored covered path, Ascertaining a quality transformed via a reference map, respectively of a relatively saved covered path, by means of a second quality function under the employment of a respective stored covered path, Ascertaining the quality of a respective saved terrain heights measurement by means of a third quality function under the employment of the corresponding saved terrain heights measurement.

Ascertaining a quality, respectively, of a reference height for each respective relative position from predetermined parameters and the corresponding reference heights by means of a fourth quality function, Determining a distribution function of the error measurement for each respective relative position for a function of the quality of each active supported position, the quality transformed via the reference maps, respectively, of each relative covered path, the quality of each respective saved terrain heights measurement, as well as the quality of each reference height, Ascertaining a distribution function of the error measurement for each respective predetermined position inside the search area as a function of the approximated five distribution functions of the total error, Ascertaining the minimum probabilities of all employed positions in the search area by means of a function of the distribution function of all total error as a probability, by which each respective position of the search area exhibits the minimal total error, Determining the quality of the support position as a function of all minimum probabilities, and Supporting the navigation solution approximated in the Strap Down Module through the navigation filter with the aid of the ascertained position support and the determined quality of the position support.

Ascertaining the quality of each respective active supported position from the respective active supported position can result from a first function with the aid of a first distribution function.

The first quality function can be a Gauss distribution function with a first variance.

With the creation of the search area, a search area centered around a supported position solution can be employed, and a varying search area measurement can be employed based on the impreciseness of each respective supported position solution. Alternatively, positions can be employed, with the creation of the search area, which are arranged equidistant to a predefined raster.

With storage, the active terrain heights measurement can be ascertained from the active heights measurement and the active supported position.

With storage of an active terrain heights measurement and the relative covered path, an allowed number of terrain heights measurements and relative routes covering the distance can be stored.

By ascertaining the quality of the stored relative covered path, transformed via reference maps, a second distribution function can be used. By ascertaining the quality transformed via a reference map, a Gauss distribution function can be used with a second variance.

The quality of each respective stored terrain heights measurement can be used as a third distribution function. Thus, a Gauss distribution function can be used with a third variance.

By ascertaining the quality of a reference height, a fourth distribution function can be used. Thus, a Gauss distribution function can be used with a fourth variance.

By ascertaining the distribution functions of the total error, a predetermined position inside the search area can be effected for each by a convolution of individual distribution functions of the error measurement.

Determining the quality of the position support can result as a function of all minimum probabilities by means of a discrete distribution function which is defined by the minimum probabilities. Alternatively, determining the quality of the position support can result via a covariance matrix, which is computed from the minimum probabilities and the actual position support.

Supporting the navigation solution, ascertained in the Strap Down Module, can result through the following steps:

Determining the support position by calculating the error measurement for each relative position, Determining the total error for each position in the search area, and Carrying out a search for the minimal total error over all total error in the search area for identifying the position support.

Furthermore, according to the invention, a navigation system with a Strap Down Module and a navigation filter with a Terrain Navigation Module for determining a navigation solution is proposed. The Terrain Navigation Module in this case has a supported position solution and a relatively covered path between two height measurements, and encompasses the following functions:

A function for ascertaining (M) a quality (14) of each active supported position (1a) from each active supported position (1a), A function for creating (H) a search area and predefined positions (7) inside the search area, A function for storing (J) an active terrain heights measurement and the relative covered path between the active terrain heights measurement and the terrain heights measurement stored last (1b), in order to use this for ascertaining the quality (15) of each relatively covered path and the quality (16) of each stored terrain heights measurement, A function for determining (K) a relative position (8) for each position (7) inside the search area and for each relatively stored covered path, A function for ascertaining (P) a quality, transformed via the reference map (6), of a relatively stored covered path (10) by means of a second quality function under the employment of each relatively stored covered path (10), A function for ascertaining (Q) a quality (16) of each stored terrain heights measurement (11) by means of a third quality function under the employment of the corresponding stored terrain heights measurement (11), A function for ascertaining (R) the quality (17) of each reference heights (6) for each relative position (8) from predetermined parameters and the corresponding reference height (8) by means of a fourth quality function, and A function for determining (S) a distribution function (18) of the error measurement for each relative position (8) from a function of the quality of each active supported position (14), the quality transformed via the reference map of each relative covered path (15), the quality of each stored terrain height measurement (16), and the quality of each reference height (17).

The Terrain Navigation Module also encompasses:

A function for ascertaining (T) a sixth distribution function (19) of the total error for each pre-determined position inside the search area (7) as a function of the ascertained distribution functions (18) of the error measurement (18), A function for ascertaining (U) the minimum probabilities (20) of all positions employed (7) in the search area by means of a function of the distribution functions (19) of all the total error as a probability, with which each position of the search area exhibits the minimal total error, A function for determining (V) the quality of the position support (4b) via a function of all minimum probabilities (20), and A function for supporting the navigation solution ascertained in the Strap Down Module (C) via the navigation filter (D) with the aid of the determined position support (4a) and the determined quality of the position support (4b).

One essential advantage of the invention over active procedures lies in the improvement of the acquisition and tracking characteristics, the increase in the integrity of the navigation system, and the increase in the modularity of the navigation system and Terrain Navigation Module.

In the following, the invention is described on the basis of the attached figures.

DETAILED DESCRIPTION OF THE INVENTION

Figure 1:
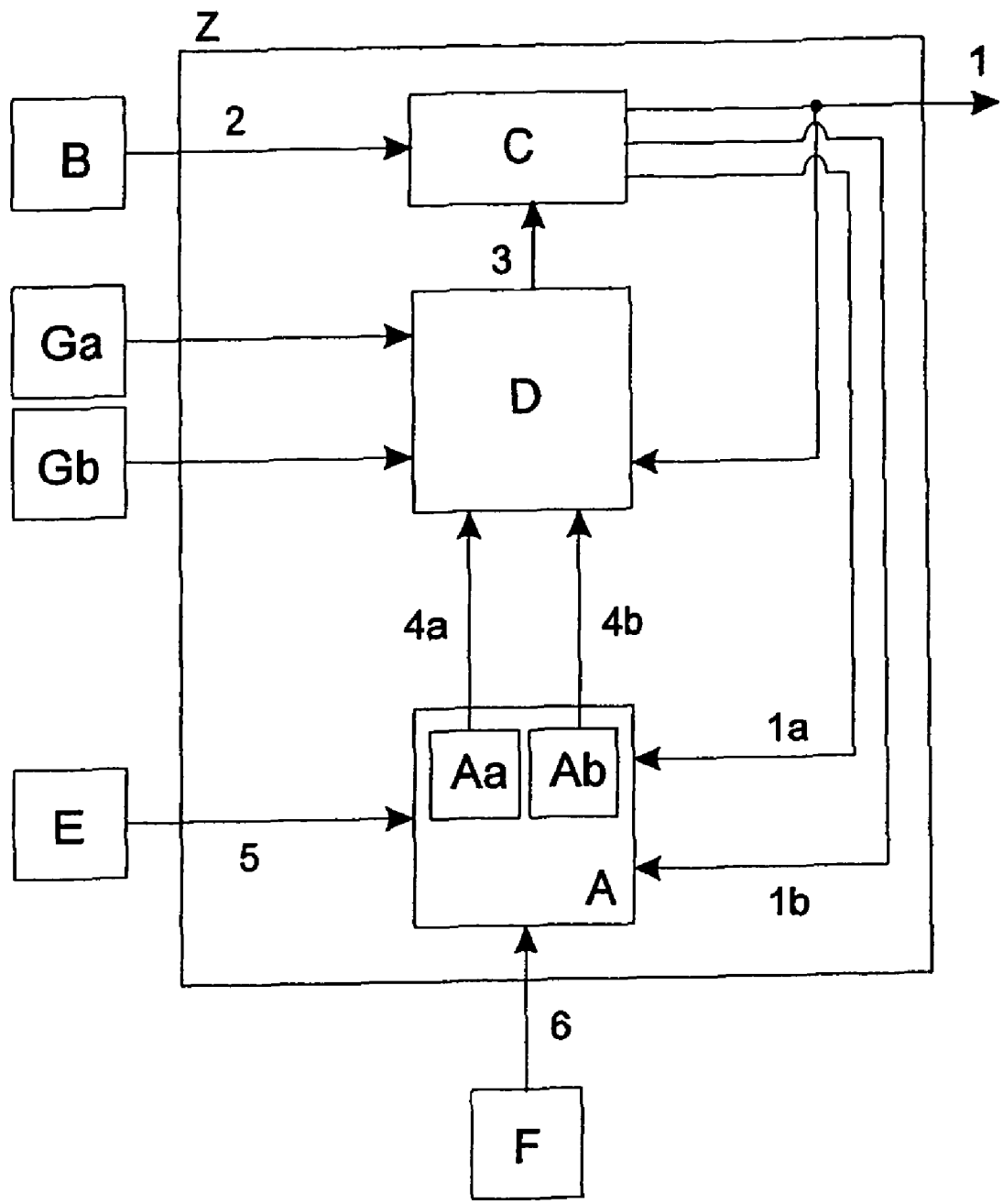
FIG. 1 is a functional representation of the functions of the navigation system with the Terrain Navigation Module.

The navigation system Z, according to the invention, encompasses a Terrain Navigation Module A, with which the determination of the navigation solution 1 can be carried out in connection with operation of an aircraft or a watercraft, and particularly, a submarine. Such an aircraft or watercraft is briefly referred to as "craft" in the following. The navigation solution absolutely encompasses the individual position of the craft. Furthermore, the navigation solution can contain the speed and location; however, these parameters are not absolutely necessary.

The navigation system Z is supplied with a measurement signal or measurement value for the acceleration and rotation rate 2, which is ascertained from an inertial sensor system or an Inertial Measurement Unit B. These input signals and input data, respectively, are assimilated to a navigation solution 1 of the craft, a supported position solution 1a, and the relative covered path between two height measurements 1b with the aid of navigation sensors A, B, Ga, Gb, a Strap Down Module C, and a navigation filter D. Thus, in the Terrain Navigation Module, the position solution 1a, supported and fused from all sensor signals, is drawn on as a position hypothesis for calculating the position support 4a and the quality of the position support 4b. Moreover, each relative covered path between two heights measurements 1b of the craft, which is determined from the acceleration and rotation rate 2 through the Strap Down Module C, is assimilated in the Terrain Navigation Module.

For a long-term stable determination of the navigation solution 1, the processing of additional sensors is absolutely necessary. The fusion of the data of various sensors is attained through the navigation filter D, which provides, based on sensor signals, adjustments 3 for the navigation solution 1, which is calculated in the Strap Down Module C. Typically, a Kalman filter is used for the navigation filter D. Other non-linear stochastic filters can also be used without restrictions, however.

The Terrain Navigation Module A provides, as an additional sensor signal 4a for the navigation filter D, the three-dimensional position of the craft, which is necessary for the long-term stability of the navigation as a position support. In addition, the Terrain Navigation Module provides information about the quality of the position support 4a.

As input quantities, the supported position solution 1a is used for the Terrain Navigation Module A, thus, the position data of the navigation solution, as a hypothesis for the actual position. Furthermore, a relatively covered path is supplied to the Terrain Navigation Module in order to be able to determine the covered path from the craft between two heights measurements. The sensor source for the Terrain Navigation represents a separation altimeter E (for example, a radar or laser altimeter for an aircraft or sonar for a watercraft, which determines the distance 5 of the craft in relation to the ground, hereafter designated as "heights measurement."

Further sensors, such as, for example, GPS Ga or barometric altimeter Gb, can, likewise, be used in the navigation filter, but they are not absolutely necessary.

Figure 2:
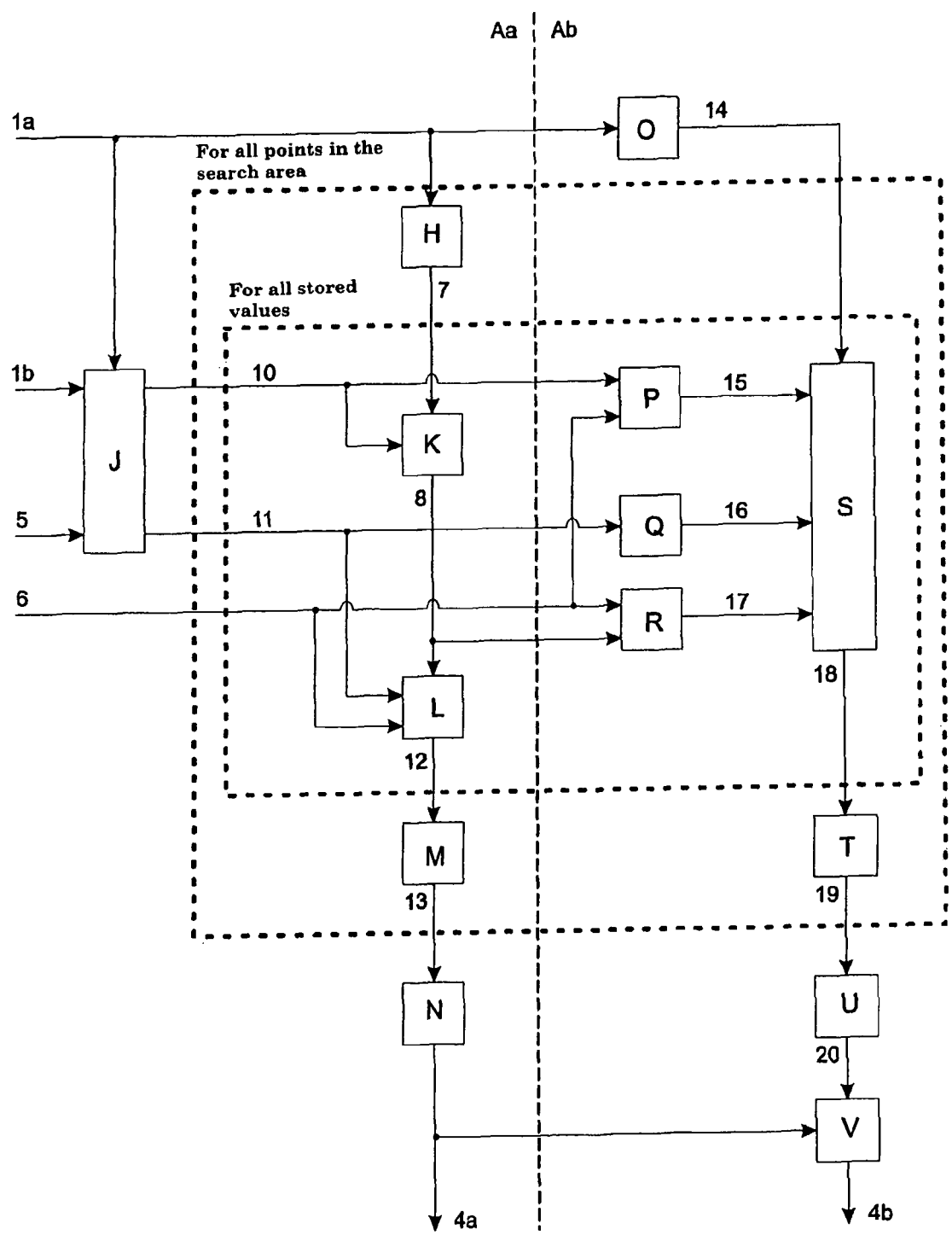
FIG. 2 is a flowchart of the essential functions of a navigation system according to the invention with the Terrain Navigation Module.

The Terrain Navigation Module is broken down in FIG. 2. The Module is divided into an area for determining the position support Aa and an area for determining the quality of the position support Ab.

In both areas, the storing at J of an active terrain heights measurement and the relative covered path between the active terrain heights measurement and the last stored terrain heights measurement 1b is collective. By storing at J, the active terrain heights measurements are ascertained from the active heights measurement 5 and the active supported position solution 1a. These stored values are used in the following to ascertain the quality of each relative covered path and the quality 16 of every stored terrain heights measurement. Moreover, the stored values are used for determining the position support 4a by calculating at L the error measurement 12 for each relative position 8, calculating at M the total error 13 for each position in search area 7, and searching for the minimal total error at N by all the total error in the search area for identifying the position support 4a. The identification of the position support 4a can result, since the position in search area 7, which exhibits the minimal total error 13, corresponds with the greatest probability of the actual position. Thus, it is established that the minimal total error 13 also leads to the greatest similarity between the stored terrain heights measurements 11, determined from the heights measurements 5 and the corresponding reference heights 6. For the following determination of the position support 4a and the quality of the position support 4b, it is sufficient, by storing at J an active terrain heights measurement and the relative covered path, to store a given number of terrain heights measurements and relative routes covering the distance measurement 1b.

Furthermore, the creation of the search area of both areas is collective. The creation of a search area on the basis of pre-determined criteria and each predetermined supported position solution 1a and the creation of predetermined positions 7 inside the search area are necessary in order to determine the position support 4a and the quality of the position support 4b. The search area defines the positions 7, which have been taken into account for identifying the position support 4a. In particular, a central centered search area, which permits, based on the imprecision of each supported position solution 1a, varying search area dimensions, can be used around a supported position solution 1a. For the search area, positions 7 can be used, which are arranged equidistant to a predefined raster. For the comparison between the previous stored terrain heights values 11 and the corresponding reference values 6, as well as for determining the value 17 of the corresponding reference values 6, a relative position 8 is necessary based on each position 7 in the search area and the corresponding saved relatively covered path. For this reason, a relative position 8 is determined for each position 7 inside the search area and each stored covered path.

The flowchart for determining the value of the position support Ab begins with ascertaining at O a quality 14 of each active supported position 1a from each active supported position 1a by means of a first quality function. The quality function is necessary in order to describe the effect of a position hypothesis full of errors, and thus of a supported position 1a full of errors. Ascertaining the quality function can result, in particular, with the aid of a first distribution function, which, in turn, can be described, in particular, by a first variance. By describing through a first variance, the distribution function can be restricted to a Gauss distribution.

For each position 7 in the search area and for each relative position 8 based on this position, the quality of each saved covered path 10 is used in order to relatively determine the effect of the error of the corresponding stored covered path and to demonstrate through a value. This results via ascertaining at P a value transformed via the reference map 6 of each relatively stored covered path 10 by means of a second value function under the use of each respective relatively stored covered path. The error of the corresponding stored relative covered path originates mainly from the error of the acceleration and rotation rate values 2 and the use through the Strap Down Module. For the value of the relatively stored covered path 10, transformed via the reference map 6, a second distribution function can be used. Furthermore, it is possible to approximate this distribution function through a Gauss distribution and determine by a second variance. For small errors of the relatively stored covered path, the determination results in the value, transformed by the reference map 6 via the linearization of the reference map, and, for larger errors, via a statistical analysis of the reference values in dependence of the error of the relatively saved covered path 10.

For every stored terrain height measurement 11, a value is ascertained in order to determine the influence of the error of the terrain height measurement on the position support 4a and on the value of the position support 4b. This is accomplished through ascertaining at Q a quality 16 of each respective stored terrain heights measurement 11 by means of a third quality function using the corresponding stored terrain heights measurement. This quality function of each respective stored terrain heights measurement 11 can be described through a third distribution function. In particular, the quality function can be determined through the restriction of the distribution function on a Gauss distribution function with a third variance.

For all relative positions 8, the influence of the error of the corresponding reference values 6 on the position support 4a and on the quality of the position support 4b is determined by a quality function. This results by ascertaining at R a relative position 8 from predetermined parameters and the corresponding reference heights by means of a fourth quality function. This quality function of a reference height can be described by a fourth distribution function. In particular, the quality function can be determined by restricting the distribution function on a Gauss function with a fourth variance.

From the determined quality functions 14, 15, 16, and 17, the effect of all errors on the input quantities 1a, 1b, 5, and 6 can be determined on the error of the error measurement 12 and through a fifth distribution function. This determination at S of a fifth distribution function 18 of the error measurement for each respective relative position 8 results from a function of the value of each active supported position 14, the quality transformed by the reference map of each relatively covered path 15, the quality of each respective stored terrain heights measurement 16, and the quality of each reference height 17. This means that, for each relative position 8, a distribution function 18 of the error measurement is determined. For an error measurement 12, based on the absolute difference and the representation of individual quality functions through Gauss distribution functions, a value density results for the distribution function 18 of the error measurement. The value density thus described is null for negative arguments and for positive arguments of the sum from the original Gauss distribution and corresponds to a Gauss distribution mirrored on the x-axis.

From the determination of the distribution function 18 of the error measurement how the error of the error measurement in 12 is described is stochastically known. Corresponding to ascertaining the total error 13, the sixth distribution function 19 of the total error can be determined. Ascertaining at T a sixth distribution function 19 of the total error for each respective predetermined position inside the search area 7 can be carried out as a function of the ascertained fifth distribution function 18 of the error measurement through the convolution of individual distribution functions of the error measurement, when ascertaining the total error 13 results as a weighted or a non-weighted sum. The sixth distribution function 19 of the total error describes the stochastic characteristics of the total error 13, which is drawn for determining the position support 4a. For this reason, it can be closed from the sixth distribution function 19 of the total error also on the stochastic characteristics, and, thus, the quality of the position support.

For the stochastic description of the quality of the position support 4b, the probability is determined from the distribution functions 19 of the total error of all positions 7 in the search area for each position 7 in the search area with the corresponding position in the search area with the corresponding position in the search area of the minimal total error 13 and thus exhibits the greatest similarity between stored terrain heights measurements 11 and reference heights 6. Ascertaining at U these minimum probabilities of all used positions 7 in the search area by means of a function of the distribution functions 19 of all total error as a probability, with which each respective position of the search area exhibits the minimal total error, represents a stochastic description of the position support 4a. The minimum probability 20 is determined by integrating, via the cumulative probability, all other error measurements that are greater than Parameter X, multiplied with the density function of the actual error measurement at the place of x. This is specified in Equation 1.1, whereby $P_{min}$ represents the minimum probability for position 7 with the $index_{mn}$ in the search area, $f_{Q_{mn}}$ describes the distribution function of the total error 19 for position 7 with the $index_{mn}$ in the search area, and $f_{Q_{kl}}$ specifies all other distribution functions of the total error 19 for the position with the $index_{kl}$ in the search area.

$$P_{min} = \int_{-\infty}^{\infty} f_{Q_{mn}}(x) \cdot \left[ \prod_{\substack{k=1 \\ k \neq m}}^{M} \prod_{\substack{l=1 \\ l \neq n}}^{N} \int_{x}^{\infty} f_{Q_{kl}}(y) \, dy \right] \cdot dx \qquad (1.1)$$

A high minimum probability thus means a high probability that the corresponding position 7 inside the search area corresponds to the actual position.

The determination V of the quality of the position support 4a via a function of all minimum probabilities 20 can result by means of a discrete distribution function, which is defined via the minimum probabilities 20. Such a discrete distribution function can be directly used in a navigation filter D. Furthermore, it is possible to represent the value of the position support 4b via a covariance matrix, which is calculated from the minimum probabilities 20 and the actual position support 4a. This covariance matrix represents an approximation of the quality, how it can be directly used in a special navigation filter D, such as a Kalman filter.

The support of the navigation solution ascertained in the Strap Down Module C by the navigation filter D, with the aid of the determined position support 4a and the determined quality of the position support 4b, closes the recursion and permits the long-term stability of the navigation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A process for determining, as a navigation solution of a navigation system with a Terrain Navigation Module, an individual position of an aircraft or watercraft, comprising:
   determining a supported aircraft or watercraft position solution, and a relative covered path between two height measurements with navigation sensors, a Strap Down Module, and a navigation filter,
   ascertaining a quality of each active supported aircraft or watercraft position solution from each respective active supported aircraft or watercraft position using a first quality function,
   creating both a search area, based on predetermined criteria and each respective supported aircraft or watercraft position solution as well as predetermined aircraft or watercraft positions inside the search area,
   storing an active terrain height measurement and the relative covered path between the active terrain height measurement and a last stored terrain height measurement in order to ascertain a quality of each respective covered path and a quality of each respective stored terrain height measurement,
   determining a relative position for each respective predetermined aircraft or watercraft position inside the search area and each respective stored covered path,
   determining a quality transformed via a reference map of each respective stored covered path by way of a second quality function under use of each stored covered path,
   ascertaining a quality of each respective stored terrain height measurement by way of a third quality function under use of a corresponding stored terrain height measurement,
   ascertaining a quality of each reference height for each relative position from predetermined parameters and corresponding reference heights by way of a fourth quality function,
   determining a distribution function of error measurement for each relative position from a function of the quality of each active supported position solution, the quality transformed via the reference map of each respective stored covered path, the quality of each respective stored terrain height measurement, and the quality of each reference height,
   ascertaining a distribution function of a total error for each predetermined aircraft or watercraft position inside the search area as a function of the distribution function of the error measurement,
   ascertaining minimum probabilities of all used aircraft or watercraft positions in the search area by way of a function of the distribution function of the total error as a probability with which each aircraft or watercraft position in the search area exhibits a minimal total error,
   determining a quality of a position support, to be supplied to and used in said navigation filter, as a function of all minimum probabilities,
   protecting the navigation solution ascertained in the Strap Down Module via the navigation filter with aid of an actual position support, to be supplied to and used, together with said quality of position support, in said navigation filter and the determined quality of the position support by closing recursion to stabilize navigation over an extended term, and
   outputting the navigation solution as the individual position of the aircraft or watercraft.

2. The process according to claim 1, wherein ascertaining the quality of each active supported aircraft or watercraft position solution is obtained from a respective active supported aircraft or watercraft position by way of a first quality function and a first distribution function.

3. The process according to claim 2, wherein the first quality function uses a Gauss distribution function with a first variance.

4. The process according to claim 1, wherein, upon creating the search area, a central area around a protected aircraft or watercraft position solution is used.

5. The process according to claim 1, wherein, upon creating the search area, varying search area dimensions are used based on imprecision of each supported aircraft or watercraft position solution.

6. The process according to claim 1, wherein, upon creating the search area, aircraft or watercraft positions which are arranged equidistant to a predefined raster are used.

7. The process according to claim 1, wherein, upon storage, the active terrain height measurement is ascertained from an active height measurement and the active supported aircraft or watercraft position solution.

8. The process according to claim 1, wherein, by storing the active terrain height measurement and the relative covered path, a given number of terrain height measurements and relative covered paths is stored.

9. The process according to claim 1, wherein, upon determining the quality transformed via the reference map of the respective stored covered path, a second distribution function is used.

10. The process according to claim 9, wherein, upon determining the quality transformed by the reference map, a Gauss distribution function with a second variance is used.

11. The process according to claim 1, wherein, upon determining the quality of each respective stored terrain height measurement, a third distribution function is used.

12. The process according to claim 11, wherein, upon determining the quality, a Gauss distribution function with a third variance is used.

13. The process according to claim 1, wherein, upon ascertaining the quality of a reference height, a fourth distribution function is used.

14. The process according to claim 13, wherein, upon ascertaining the quality, a Gauss distribution function is used with a fourth variance.

15. The process according to claim 1, wherein ascertaining the distribution function of the total error for each respective predetermined aircraft or watercraft position inside the search area is carried out over convolution of the individual distribution functions of error measurement.

16. The process according to claim 1, wherein determining the quality of the position support as a function of all minimum probabilities results from a discrete distribution function which is defined through the minimum probabilities.

17. The process according to claim 1, wherein determining the quality of the position support results via a covariance matrix, which is calculated from the minimum probabilities and the actual position support.

18. The process according to claim 1, wherein protecting the navigation solution ascertained comprises determining the position support via calculation of error measurement for each respective relative aircraft or watercraft position, determining a total error for each aircraft or watercraft position in the search area, and searching for the minimal total error by all total error in the search area.

19. A navigation system for which a navigation solution is determined by the process of claim 1.

* * * * *